United States Patent
Sebeni et al.

(10) Patent No.: US 8,824,411 B2
(45) Date of Patent: Sep. 2, 2014

(54) TUNE-AWAY DETECTION BASED ADAPTIVE LINK ADAPTATION FOR HYBRID TRANSCEIVERS

(75) Inventors: Johnson O. Sebeni, Fremont, CA (US); Zhu Ji, San Jose, CA (US); Navid Damji, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 101 days.

(21) Appl. No.: 13/604,027

(22) Filed: Sep. 5, 2012

(65) Prior Publication Data

US 2013/0315153 A1 Nov. 28, 2013

Related U.S. Application Data

(60) Provisional application No. 61/651,343, filed on May 24, 2012.

(51) Int. Cl.
*H04W 4/00* (2009.01)

(52) U.S. Cl.
USPC .......................................................... 370/329

(58) Field of Classification Search
CPC ....... H04L 1/0001; H04W 4/14; H04W 48/18
USPC .......................................................... 370/329
See application file for complete search history.

(56) References Cited

U.S. PATENT DOCUMENTS

| | | | |
|---|---|---|---|
| 7,248,889 B2 | 7/2007 | Schwarz et al. | |
| 7,269,422 B2 | 9/2007 | Gunnarsson et al. | |
| 2009/0069042 A1 * | 3/2009 | Wang et al. | 455/522 |
| 2009/0075598 A1 * | 3/2009 | Pietraski et al. | 455/67.13 |
| 2010/0087219 A1 * | 4/2010 | Jonsson et al. | 455/522 |
| 2010/0298001 A1 * | 11/2010 | Dimou et al. | 455/441 |
| 2011/0294508 A1 | 12/2011 | Min et al. | |
| 2012/0002610 A1 | 1/2012 | Widegren et al. | |
| 2012/0069759 A1 | 3/2012 | Gummadi et al. | |
| 2012/0157152 A1 | 6/2012 | Blomgren et al. | |
| 2013/0172023 A1 * | 7/2013 | Chan et al. | 455/466 |
| 2013/0301758 A1 * | 11/2013 | Reial et al. | 375/340 |

FOREIGN PATENT DOCUMENTS

WO 2011162361 12/2011

OTHER PUBLICATIONS

International Search Report from PCT/US2013/039633, dated Aug. 12, 2013, Apple Inc., 4 pages.

* cited by examiner

*Primary Examiner* — Asad Nawaz
*Assistant Examiner* — Syed S Ali
(74) *Attorney, Agent, or Firm* — Meyertons, Hood, Kivlin, Kowert & Goetzel, P.C.

(57) ABSTRACT

Various method and apparatus embodiments for adjusting control loop parameters for wireless communication link are disclosed. The adjustments may be performed responsive to a single radio UE tuning away from a first network to a second network, or due to a fading condition. Responsive to detecting the tuning away of the UE or the fading condition, the base station may adjust one or more parameters of a control loop. The adjustments may include changing parameters of one or more filters in the BS. For example, a block error rate (BLER) first state can be reset to a small value, or can be incrementally adjusted responsive to detecting discrete transmissions (DTX) or other signals from the UE. In another example, BLER filter coefficients may be updated responsive to DTX detections.

11 Claims, 10 Drawing Sheets

| CQI Index | Modulation | Code Rate x 1024 | Efficiency |
|---|---|---|---|
| | Out of Range | | |
| 0 | | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 4

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

FIG. 5

TUNE-AWAY DETECTION BASED ADAPTIVE LINK ADAPTATION FOR HYBRID TRANSCEIVERS

PRIORITY

This application claims priority to U.S. Provisional Patent Application 61/651,343, entitled "Tune-Away Detection Based Adaptive Link Adaptation for Hybrid Transceivers," filed May 24, 2012, and which is hereby incorporated by reference in its entirety as though fully and completely set forth herein.

BACKGROUND

1. Technical Field

This disclosure is directed to wireless communications, and more particularly, to systems and methods for tune-away detection for outer loop link adaptation.

2. Description of the Related Art

Wireless communication systems are rapidly growing in usage. Further, wireless communication technology has evolved from voice-only communications to also include the transmission of data, such as Internet and multimedia content.

Some present wireless communication devices (e.g., cell phones) use a single radio for two or more wireless communication networks, e.g., a first network using LTE and a second network using CDMA. In such systems, the wireless communication device may periodically tune from the first network to the second network, e.g., to listen to a paging channel. In such cases, measured error rates such as block error rate, (BLER) or channel quality indicators (CQIs) may be measured as very high (e.g., 100% error rate) or poor, respectively. Similar cases can occur in long fade environments, where interrupted communication with the first network can cause an out of sync situation.

When these communication interruptions occur, the high error rates may result in a poorly selected modulation and coding scheme, e.g., since it is based on an interrupted channel rather than channel conditions.

SUMMARY

Various method and apparatus embodiments for adjusting control loop parameters for wireless communication link are disclosed. In one embodiment, a base station (BS) of a first network is configured to detect that a single-radio user equipment (UE; a wireless device) has tuned away to a second network, wherein the tuning away may be a temporary condition. Responsive to detecting the tuning away of the UE, the base station may adjust one or more parameters of a control loop. The adjustments may include changing parameters of one or more filters in the BS. For example, a block error rate (BLER) first state can be reset to a small value, or can be incrementally adjusted responsive to detecting discrete transmissions (DTX) or other signals from the UE. In another example, BLER filter coefficients may be updated responsive to DTX detections. Adjusting the control loop parameters may allow for more rapid restoration of a link between the BS and the UE when the UE re-tunes to the first network.

In another embodiment, the BS may determine that a fading condition has occurred in the link with a UE (which may or may not be a single radio UE). Responsive to detecting the fading condition, the BS may adjust one or more control loop parameters, such as those listed above.

BRIEF DESCRIPTION OF THE DRAWINGS

The following detailed description makes reference to the accompanying drawings, which are now briefly described.

FIG. 4 illustrates an exemplary table of CQI values according to one embodiment.

FIG. 5 illustrates an exemplary table of modulation and coding schemes which may be used in determining CQI values, according to one embodiment.

Figure 1A:
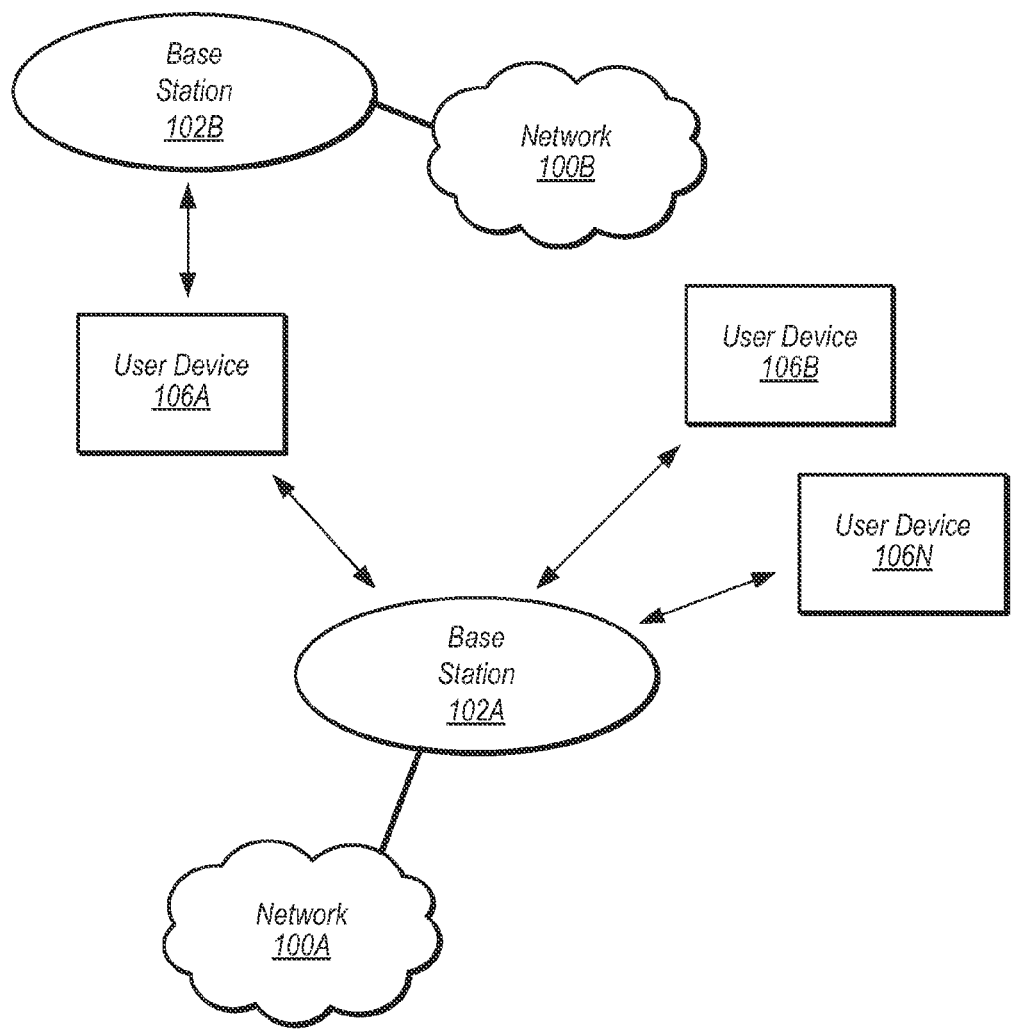
FIG. 1A illustrates an exemplary wireless communication system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Acronyms

The following acronyms are used in the present patent application:
BLER: Block Error Rate (same as Packet Error Rate)
BER: Bit Error Rate
BS: Base Station
CRC: Cyclic Redundancy Check
CSF: Channel State Feedback
DTX: Discrete Transmission
DL: Downlink
LTE: Long Term Evolution (4G)
PER: Packet Error Rate
SINR: Signal to Interference-and-Noise Ratio
SIR: Signal to Interference Ratio
SNR: Signal to Noise Ratio
SRLTE: Single Radio LTE
Tx: Transmission
UE: User Equipment
UL: Uplink
UMTS: Universal Mobile Telecommunication System

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication. A UE/UE device may include a radio, which may be a transceiver used to transmit signals to and receive signals from other equipments, such as other transceivers in a base transceiver station. Throughout this specification, reference is made to a UE/UE device tuning to a network, tuning away from a network, and re-tuning to a network. Tuning a UE/UE device to a network (or tuning the radio of a UE/UE device to a network) as defined herein may refer to configuring the radio/transceiver of the UE/UE device to communicate with a particular (first) radio access network (RAN) using a particular radio access technology (RAT). Tuning away as defined herein may refer to configuring the radio/transceiver of a UE/UE device to communicate with another RAN using another RAT after having previously established a link with a first RAN. Re-tuning as defined herein may refer re-configuring the radio/transceiver of a UE/UE device to resume communications (or attempt to resume communications) with the first RAN using the RAT through which a link was established prior to tuning away.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

It is noted that while some of the embodiments discussed below focus single radio UEs that communicate with LTE and CDMA networks, it is noted that the disclosure is not so limiting. Embodiments that communicate with other types of networks and/or use other communications protocols are possible and contemplated. Furthermore, various method embodiments discussed below may also be suitable for use with UMTS UE's configured for concurrent use with multiple networks, particularly in channel fading conditions.

Figure 1B:
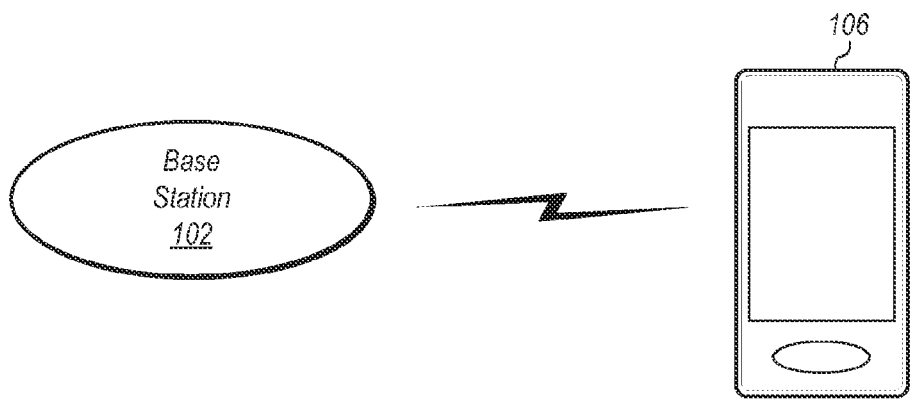
FIG. 1B illustrates a base station 102 in communication with user equipment (UE) 106.

FIGS. 1A and 1B—Communication System

FIG. 1A illustrates an exemplary (and simplified) wireless communication system. It is noted that the system of FIG. 1A is merely one example of a possible system, and embodiments may be implemented in any of various systems, as desired. As shown, the exemplary wireless communication system includes two base stations 102A and 102B, each of which communicates over a respective transmission medium with one or more User Equipment (UE) (or "UE devices") 106A through 106N.

The base stations 102A and 102B may each be a base transceiver stations (BTS) or cell sites, and may include hardware that enables wireless communication with the UEs 106A through 106N. The base station 102A may also be equipped to communicate with a network 100A, while base station 102B may be equipped to communicate with network 100B. Embodiments are possible and contemplated wherein base stations 102A and 102B are co-located. If not co-located, base stations 102A and 102B may be within the geographical vicinity of one another such that at least one of the UEs (UE 106A in this example) may communicate with either one from a given location. Generally, the base stations 102A and 102B may facilitate communication between the UEs and/or between the UEs and the networks 100A and 100B, respectively. The communication areas (or coverage area) of the base station may be referred to as "cells." The base stations 102A and 102B and the UEs may be configured to communicate over the transmission medium using any of various wireless communication technologies such as GSM, CDMA, WLL, WAN, WiFi, WiMAX, 3G, LTE, etc.

FIG. 1B illustrates UE 106 (e.g., one of the devices 106A through 106N) in communication with a base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the embodiments described herein by executing such stored instructions. In some embodiments, the UE 106 may include a programmable hardware element such as an FPGA (field-programmable gate array) that is configured to perform any of the method embodiments described herein, or any portion of any of the method embodiments described herein. The various methods described herein may also be performed using other types of hardware, software, or any combination thereof.

In some embodiments, the UE 106 may be configured to generate channel state information (CSI) that may be provided back to the base station (BS) 102. The base station 102 may use CSI to adjust its communications with the respective UE 106, or possibly other UEs 106. For example, in one embodiment the base station 102 may receive and utilize CSI from multiple UEs 106 to adjust its communication scheduling among the various UEs within its coverage area (or cell).

As discussed herein, various adjustments may be performed in generating channel quality indicator(s) (CQIs) of the CSI by the UE 106 or by the BS 102 to the received information in the CSI. Moreover, while many of the embodiments below are primarily directed to the operation and adjustment at the BS 102, similar adjustments may be performed on the UE 106 side.

Figure 2:
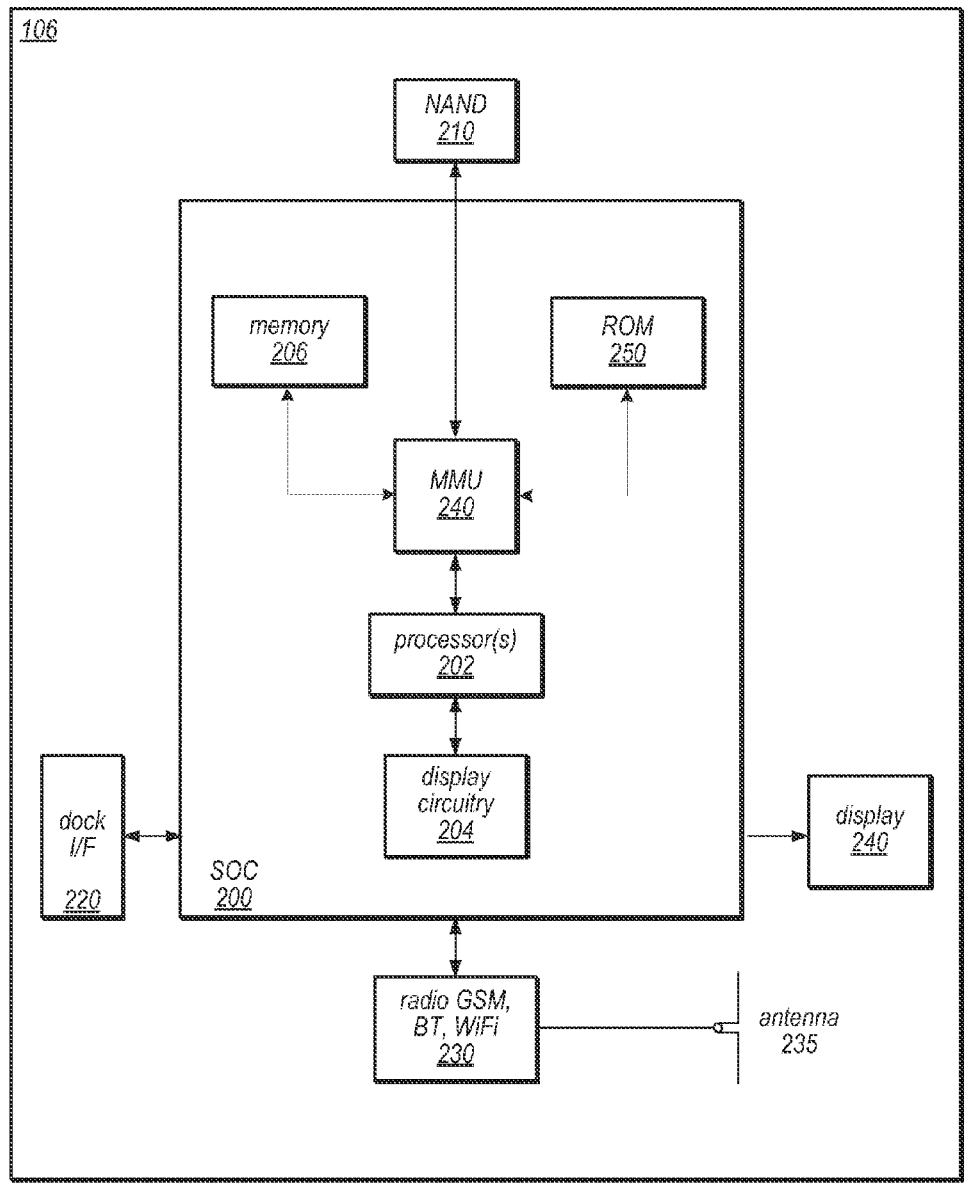
FIG. 2 illustrates an exemplary block diagram of a UE 106, according to one embodiment.

FIG. 2—Exemplary Block Diagram of a UE

FIG. 2 illustrates an exemplary block diagram of a UE 106. As shown, the UE 106 may include a system on chip (SOC) 200, which may include different functional units for various purposes. For example, as shown, the SOC 200 may include processor(s) 202 which may execute program instructions for the UE 106 and display circuitry 204 which may perform graphics processing and provide display signals to the display 240. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, radio 230, connector I/F 220, and/or display 240. The MMU 240 may be configured to perform memory protection and page table translation or set up. In some embodiments, the MMU 240 may be included as a portion of the processor(s) 202.

As also shown, the SOC 200 may be coupled to various other circuits of the UE 106. For example, the UE 106 may include various types of memory (e.g., including NAND flash 210), a connector interface 220 (e.g., for coupling to the computer system), the display 240, and wireless communication circuitry 230 (e.g., for GSM, Bluetooth, WiFi, etc.) which may use antenna 235 to perform the wireless communication. In one embodiment, a single radio may be used to communicate with multiple networks (e.g., LTE and CDMA networks, among other types). For example, the radio may periodically tune away from a first network (e.g., an LTE network) to listen to a paging channel of a second network (e.g., a CDMA network). Embodiments described herein may be particularly useful during such times. Additionally, the UE 106 may include hardware and software components for generating and/or providing CQI values (e.g., for CSI) to a base station. In another embodiment, UE 106 may be a UTMS UE in which radio 230 includes multiple transceivers. Various embodiments of the methods discussed below may be useful with a UTMS UE in fading scenarios in which sudden, deep fading occurs on a communication channel established between the UE and one of the networks.

Figure 3:
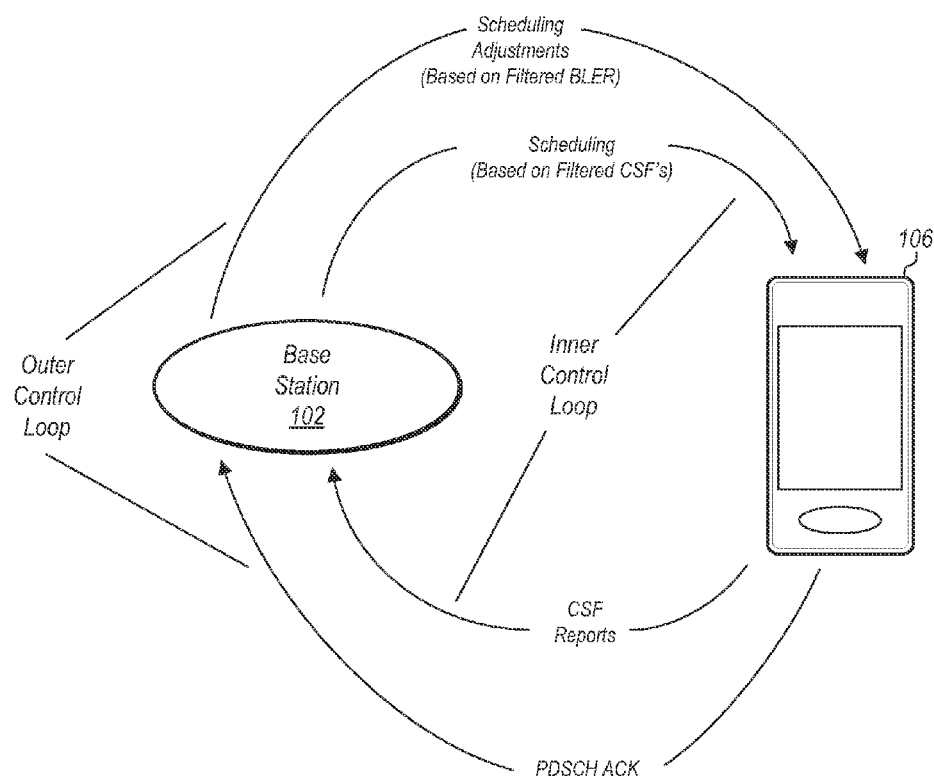
FIG. 3 is a block diagram illustrating control loops used in communications between a base station and a UE.

Control Loops:

FIG. 3 illustrates one example of control loops that a base station 102 may use in establishing and maintaining communication with a UE 106. The control loops include an inner loop and an outer loop. The inner control loop in the embodiment shown is based on CSF reports sent from UE 106 to base station 102. The CSF reports may include information on the state of a communication channel established between base station 102 and UE 106, from the perspective of UE 106. The information may include a reported data rate that UE 106 estimates that it can support, which may also include the optimal MIMO (multiple input and multiple output antennas) configurations such as the rank indication (RI) and precoding matrix index (PMI). Based on the data rate that UE 106 estimates that it can support and other information from filtered CSFs, base station 102 may generate scheduling information that is provided to UE 106. The scheduling information may include information such as a code rate, a number or resource blocks, and a scheduling rate.

In some cases, the data rate which UE 106 estimates that is can support may not be accurate. Accordingly, the outer loop is provided for compensation. In the outer control loop, the UE may transmit physical downlink shared channel (PDSCH) information back to base station 102. The PDSCH information may provide indications of an actual data rate that the UE is supporting in communicating with base station 102 with the selected modulation and coding scheme, and number of information streams, codeword. Additional details regarding PDSCH information is described below. Base station 102 receives the ACK/NAK information transmitted in UL by the UE of the DL PDSCH, based on which a filtered BLER may be extracted at base station 102. Using the filtered BLER information, base station 102 may perform scheduling adjustments in order to more accurately match the transmitted data rate to a rate which UE 106 can actually support at that given time. The information transmitted between UE 106 and base station 102 may be updated as channel conditions change.

Generally speaking, the outer loop may take a longer time to converge to accurate values relative to the inner loop. When channel conditions change rapidly, e.g., due to a tune-away of a single-radio UE (e.g., from LTE to CDMA), or of a sudden fading in the channel of any type of UE, the filtered BLER can rapidly increase, and may become 100%. If the UE attempts to retune to the network supported by base station 102, or the fading subsides, it may take a significant amount of time to restore the communication channel to its previous condition due to the high BLER. Ideally, the BLER may be less than or equal to a certain target value. Accordingly, the greater the BLER is relative to this target value, more time may be consumed in restoring the communication channel. Various methods that can be performed by base station 102 are discussed below to mitigate the effects of a high BLER in tune-away and fading situations. These methods may be based on various metrics which are now discussed in further detail.

Exemplary Details Regarding CSI

In LTE, the CSI may include the following three components: channel quality indicator (CQI), PMI, and RI. The CSI may be provided from the UE to the BS.

Within LTE, CQI is defined as follows: Based on an unrestricted observation interval in time and frequency, the UE shall derive for each CQI value reported in uplink subframe n the highest CQI index between 1 and 15 in the Table shown in FIG. 4 which satisfies the following condition, or CQI index 0 if CQI index 1 does not satisfy the condition: A single PDSCH transport block with a combination of modulation scheme and transport block size corresponding to the CQI index, and occupying a group of downlink physical resource blocks termed the CQI reference resource, could be received with a transport block error probability not exceeding 0.1. Note that the table of FIG. 4 may be modified to correspond to SINR instead of efficiency, as desired.

Within LTE, PMI is defined as the precoding matrix index that the UE can feedback to the BS for its selection of precoding matrix to optimize the throughput. In one embodiment, the UE may determine the optimal PMI based on its channel estimation and calculates the expected throughput with available hypotheses of precoding matrices.

Within LTE, RI is defined as the indicator that signals the BS the number of transmission layers the UE can support to optimize throughput. In LTE, the modulation and coding schemes (MCSs) are defined to allow different levels of coding rates and modulation orders such as in the table of FIG. 5 for a PDSCH. The TBS index may be used in transport block size tables. This table may be used by the UE and/or BS for selection of MCSs.

Based on the description of the CQI definition for LTE, from the UE perspective, it is desired to achieve, in one embodiment, the 10% BLER target for any CQI given the DL configuration. Additionally, the scheduling algorithm in BS may be designed according to this UE requirement to increase throughput.

Note that what is proposed in LTE specification is one way of reporting and using CQI for optimizing the receiver throughput, which sets a fixed BLER target for the UE that can simplify the optimization at the BS. However, in order to further increase efficiency, adaptive BLER target can be used based on the UE channel conditions and network scenarios. Note that in the rest of the discussion, embodiments will be directed to those with the fixed BLER target for CQI, but the procedure can be generalized to varying BLER targets for CQI. Note that for MIMO transmissions, multiple hypotheses of the precoding matrices and rank selection (the number of spatial layers) can be tried by the UE to determine the optimal precoding matrix index (PMI) and rank indication (RI).

Exemplary CQI Calculation

Figure 6:
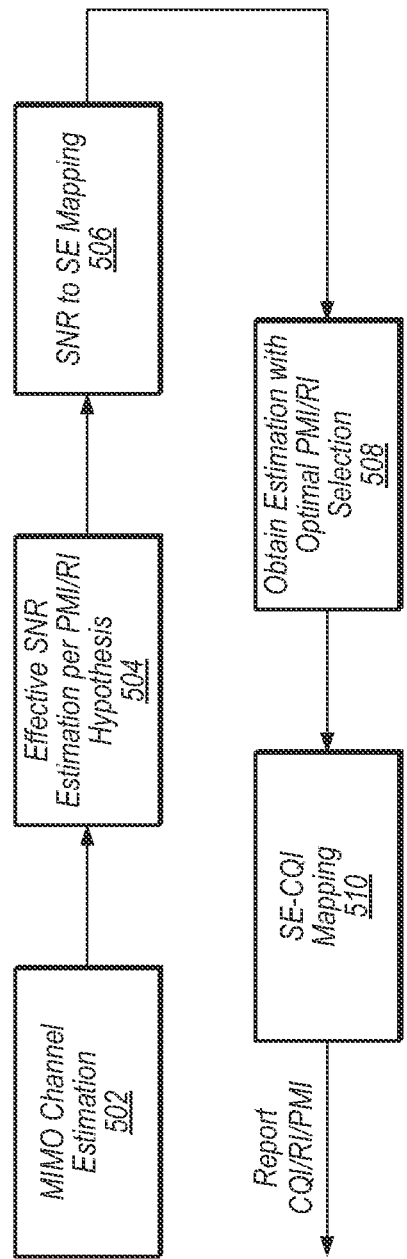
FIG. 6 illustrates an exemplary method for providing CSI, according to one embodiment.

FIG. 6 illustrates embodiments of a method for generating channel quality indicators according to one embodiment. The method of FIG. 6 may generate a CQI that is based on the current conditions that is being experienced by the UE 106. The method shown in FIG. 5 may be used in conjunction with any of the computer systems or devices shown in the Figures, among other devices. In various embodiments, some of the method elements shown may be performed concurrently, in a different order than shown, or may be omitted. Additional method elements may also be performed as desired. As shown, the method of FIG. 5 may operate as follows.

In 502, MIMO channel estimation and/or noise estimation may be performed. In one embodiment, the channel estimation may be used to generate a whitened channel estimation matrix for CQI calculation.

In 504, effective SNR estimation per PMI/RI Hypothesis may be determined. In one embodiment, the SNR estimation may be based on the whitened channel estimation and the receiver algorithm. Generally speaking, there are several types of receiver demodulation algorithms including LMMSE (linear minimum mean square error), MLM (maximum likelihood method), and LMMSE-SIC (LMMSE with serial interference cancellation), among others.

In 506, the estimated SNR value may be mapped to an estimated spectral efficiency (SE) metric, e.g., using an SNR to SE mapping table. This mapping may be based on the channel capacity and possible loss due to practical receivers. Note that the SE estimation can be done in a finer granularity on a small number of resource blocks (e.g., two RBs). In one embodiment, the SE may be further processed, e.g., involving averaging across wideband, filtered over time, etc.

In 508, an estimation with the optimal PMI/RI (precoding matrix index/rank index) selection may be performed. The PMI/RI may be related to MIMO transmissions and may indicate the number of layers of transmission in MIMO scenarios. In one embodiment, the UE can use its channel estimation to determine the best PMI & RI and feedback to BS for it to apply at the BS side. In general, these values may be calculated along with CQIs, and conceptually, they are all part of CSI. In the context of LTE, the channel quality feedback may report CQI, PMI and RI separately.

In 510, SE to CQI mapping may be performed to determine the CQI, e.g., using an SE-CQI mapping table. The SE-CQI mapping table may be selected based on the current communication scenario as noted above. The CQI and/or RI/PMI values may then be reported. Note that CQIs may include any of various channel quality feedback indications. For example, the term "CQI" may generally include RI/PMI values as well as the channel quality for BS to select a proper code rate (MCS). Thus, discussions above regarding CQI may include one or more values, including RI/PMI values. In this specific instance, the channel quality, RI, and PMI values are provided in the CSI.

Generally, filtering the SE may be important for CQI/PMI/RI reporting and may reflect how fast the UE responds to the channel or related spectral efficiency changes. In one embodiment, the filtering mechanisms may include FIR or IIR. FIR filtering generally has a fixed length of memory and is a weighted sum of previous SE estimation. An IIR filter generally has a memory of infinite length with the impact of each sample exponentially decreasing, which typically provides a smooth weighted average across the time. A simple IIR filter would be a single-pole IIR filter and the time constant can be approximated as the inverse of the IIR filter coefficient.

Furthermore, the CSI requested by the BS may include a wide-band (WB) or M-subband report. The WB report may require the UE to report an averaged WB estimation of CQI. The M-subband CQI report mode specifies the UE to report the subband CQIs on M different subbands with a defined number of RBs (in LTE, each RB may contain 12 tones with 180 kHz bandwidth). In order to respond to different CQI report mode, the SE averaging or filtering may need to be performed in the frequency domain accordingly.

Exemplary Block Diagram of UE and BS

Figure 7:
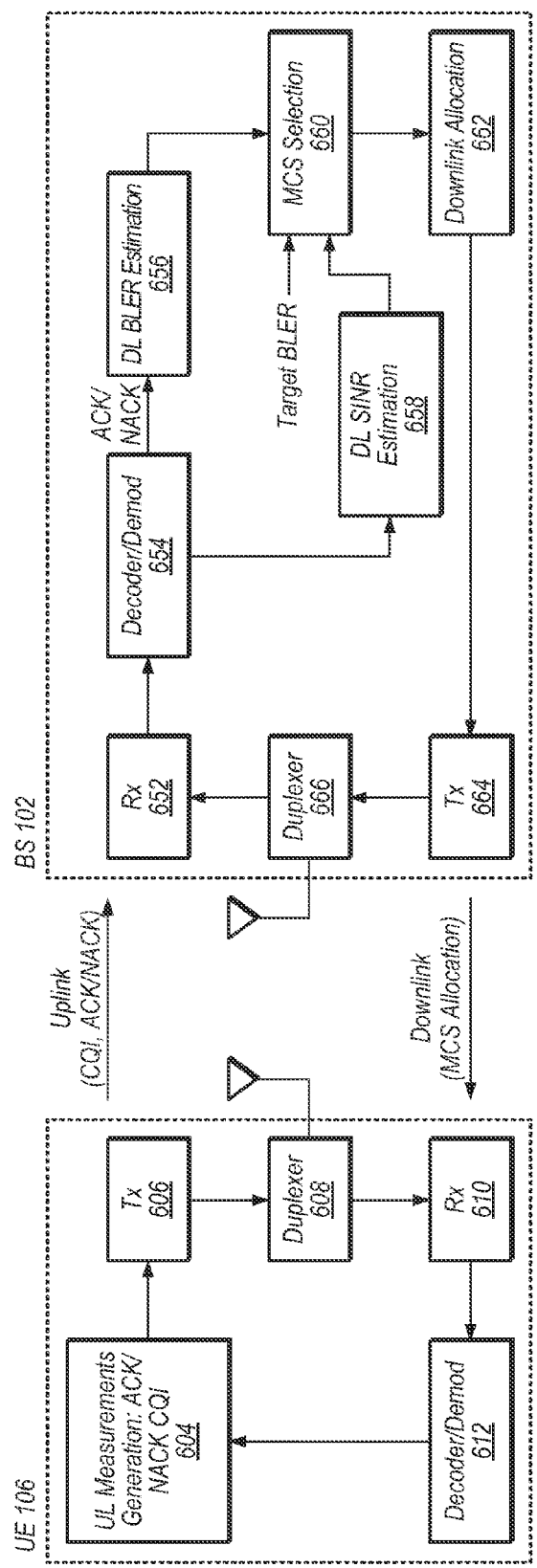
FIG. 7 illustrates an exemplary block diagram illustrating operation of a UE and a BS, according to one embodiment.

FIG. 7 illustrates an exemplary block diagram showing interaction between the UE 106 and BS 102. More specifically, as shown, the UE 106 may be configured to perform various link measurement generation, e.g., ACK, NACK, CSI (e.g., including CQI, PMI, RI, etc.) using measurement block 604. These measurements may be provided to the base station via transmission (Tx) circuitry 606, e.g., as selected by the duplexer 608. Further details regarding the CSI and generation of information included in the CSI were discussed above, e.g., regarding the tables of FIGS. 4-5.

On the receiving side of the UE 106, signals from the BS 102 may be received via reception (Rx) circuitry 610, as selected by the duplexer 608, and decoded/demodulated for provision to the measurement generation block via decoder/demod 612, which may be used to provide the various information discussed above.

Turning to the BS 102, the measurements provided by the UE 106 may be received by Rx circuitry 652 (via the duplexer 666). This information may be decoded/demodulated via decoder/demod 654 and used to estimate BLER, e.g., via received ACK/NACKs, and also to estimate SINR, in DL BLER estimation 656 unit and DL SINR estimation unit 658, respectively. More specifically, based on the reported CQI, the BS 102 may derive the downlink (DL) SINR as seen by the UE 106. Additionally, the BS 102 may estimate the DL BLER based on the reported ACK/NACK messages from the UE 106 corresponding to the DL transmissions.

At steady-state, if the measured BLER is lower than the BLER target, a positive offset may be applied to the estimated DL SINR (derived from the reported CQI), otherwise a negative offset may be applied. In one embodiment, the offset may be set at an initial value, and changes to the offset may be applied incrementally. For example, the offset may be initially set at a default value (e.g., 0), and adjusted upwards or downwards in increments (e.g., static or variable increments) based on the measured BLER as compared to the BLER target. For example, if the BLER is lower than the BLER target, the current offset value may be increased, whereas if the BLER is higher than the BLER target, the current offset may be decreased.

The estimated DL SINR may be used to pick the right MCS based on a SINR-MCS mapping available at the BS 102, using MCS selection unit 660. Said another way, the SINR offset may be used to adjust the DL SINR estimated from the CQI values (e.g., from the CSI). Thus, the output of the BLER and SINR estimations, along with target BLER, may be used to select a modulation and coding scheme (MCS). This MCS mapping or selection process may be referred to as "outer loop link adaptation", which may typically be based on reported CQI and estimated BLER. In turn, data may be transmitted back to the UE 106 using the selected MCS (via downlink allocation 662, Tx circuitry 664, and the duplexer 666).

BLER estimation unit 656 in one embodiment may implement a BLER filter. The BLER filter may be implemented as an infinite impulse response (IIR) filter, although embodiments where a BLER filter is implemented as a finite impulse response (FIR) filter are also possible and contemplated. The BLER filter may derive a BLER value from information received from a UE. The derived BLER value may be used for, among other things, to perform scheduling adjustments for the outer control loop as discussed above with reference to FIG. 3. BLER estimation unit 656 may also implement functionality for comparing the derived BLER value to a target value. Further scheduling adjustments may be performed based on the derived BLER value relative to the target value.

In some embodiments, Rx circuitry 652 may be configured to perform Doppler measurements in order to determine if UE 106 is moving toward or away from BS 102. Moreover, Doppler measurements may also be used to determine the velocity at which the UE 106 is moving toward or away from BS 102. In some embodiments, other processing circuitry may be implemented to perform the Doppler measurements based on signals provided by Rx circuitry 652. In either case, the Doppler information may be used to determine a methodology for performing control loop adaptation responsive to detecting a tune away of UE 106, as well as for BLER filter state increments.

In the embodiment shown, UE 106 may include only a single transmitter 606 and a single receiver 610, and may thus be considered a single radio embodiment. However, UE 106 may be capable of communications with two or more different types of networks, e.g., an LTE network and a CDMA network. Since there is only a single radio in this embodiment, such communications may occur on a timeshare basis. In one embodiment, when UE 106 is tuned to an LTE network, it may periodically tune away to monitor paging signals on a CDMA network. Other reasons that UE 106 may tune away from the LTE network to the CDMA network may include registration, location updates, search and measurements, voice calls, and out-of-service (OOS) procedures. The amount of time tuned away from LTE to CDMA may vary from one instance to the next. Such instances of tuning away may occur with the intention to re-tune to the LTE network. However, UE 106 may not be configured to inform the LTE network that it is tuning away. Therefore BS 102, an LTE base station in this example, may be unaware that UE 106 has tuned away. Accordingly, failure to receive expected communications from UE 106 may cause error rates, such as BLER, to rapidly rise and thus bias the outer control loop into a bad states. If allowed to remain in a such a state, the convergence of outer control loop upon UE 106 re-tuning to BS 102 may be delayed. This delay in turn results in a greater amount of time in restoring the link to a good quality state and thus loss of throughput. However, in the embodiment shown, BS 102 may be configured to detect that UE 106 has tuned away from the LTE network despite not being informed of the same. When such a detection is made, BS 106 may perform one or more adaptation algorithms in order to mitigate the effects of the high BLER. This in turn may reduce the time for convergence of the outer loop upon a re-tune of UE 106 to the LTE network, and thus allow the link to be restored faster. Examples of various methods used to mitigate the effects of high BLER during a tune-away will now be discussed. It is noted that these methods may also be used with various type of UEs (single or multiple radio embodiments included) during situations of rapid fading of a link.

Tune-Away Detection and Outer Loop Adaptation:

Even during a tune-away and fading situations, a UE may transmit periodic uplink signals that may be detected by a BS. For example, a UE may transmit physical layer uplink control channel (PUCCH) signals, sounding reference signals (SRS), and so on. A BS, such as BS 102 discussed above, may be configured to implement one or more discrete transmission (DTX) detection algorithms. The algorithms can be used to detect if such uplink signals are present or not based on, e.g., received power levels, exploration of the signal structure of a control channel or SRS, and so on. A BS may also consider combinations of such uplink signals. Using one or more detections of these types of signals, the BS may be able to obtain a level of confidence that a tune-away has occurred by the UE. In some instances, such uplink signals may also be detected by BS even though fading has occurred in the original communication channel (e.g., the LTE channel with the UE). When the BS has obtained a sufficient level of confidence that the UE has tuned away, it may perform one or more methods to mitigate the effects on the outer control loop that otherwise occurs during the tune-away. Furthermore, if the BS is otherwise detecting various ones of the uplink signals during a fading situation, it may also be able to obtain a level of confidence that the UE may attempt to restore a link once the condition producing the fading has subsided. As such, the methods discussed for mitigating the effects on the outer control loop during tune-away may also be useful in some fading situations.

Figure 8:
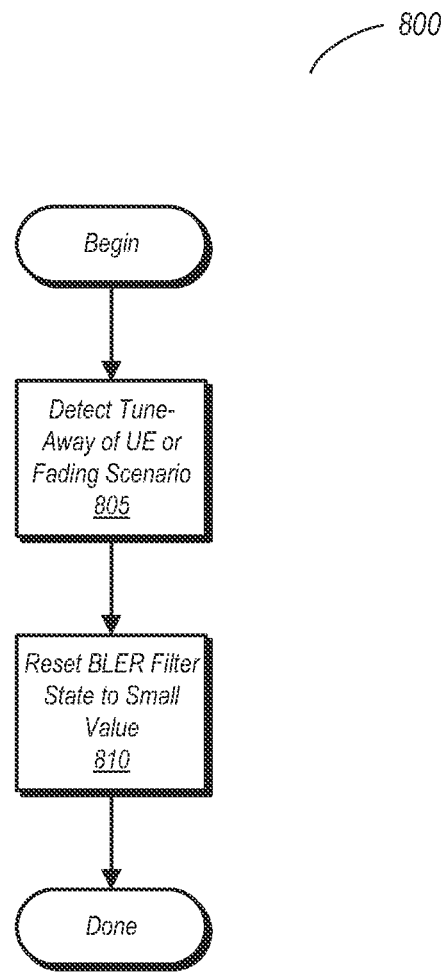
FIG. 8 is a flow diagram illustrating one embodiment of a method for adapting an outer loop responsive to a BS detecting a tune away of the UE to a second network or detecting deep fading condition.

FIG. 8 is a flow diagram of one embodiment of a method for one embodiment of a method for adapting an outer loop responsive to a BS detecting a tune away of the UE to a second network or detecting deep fading condition. The methodology described herein may be performed by any of the various BS embodiments discussed above, and may also be performed by other embodiments of a BS not explicitly discussed herein. Furthermore, the method may be performed during communications with a single radio UE or in some cases with UTMS embodiments having multiple radios.

Method 800 begins with the detection by a BS of a tune-away or a fading scenario (block 805). The tune-away may comprise a UE tuning away from an established link with the BS to monitor traffic on another network. Fading may occur for multiple reasons, and may temporary in some cases. Detection of the tune-away or fading may be based on DTX detection, such as a consecutive number of DTX detections out of expected previous transmissions. When such a detection is made, the BS may set the BLER filter sate to a small value (block 810) instead of letting it change to a free-run value that is at or close to 100%. Holding the BLER filter state to a small value may mitigate the effects to the outer control loops in the event that the UE re-tunes to the BS. More particularly, the outer control loop may converge to a suitable value (e.g., the BLER rate being less than a target value) in a significantly reduced amount of time upon a re-tuning of the UE to the BS, thereby allowing a faster restoration of the communication link.

Figure 9:
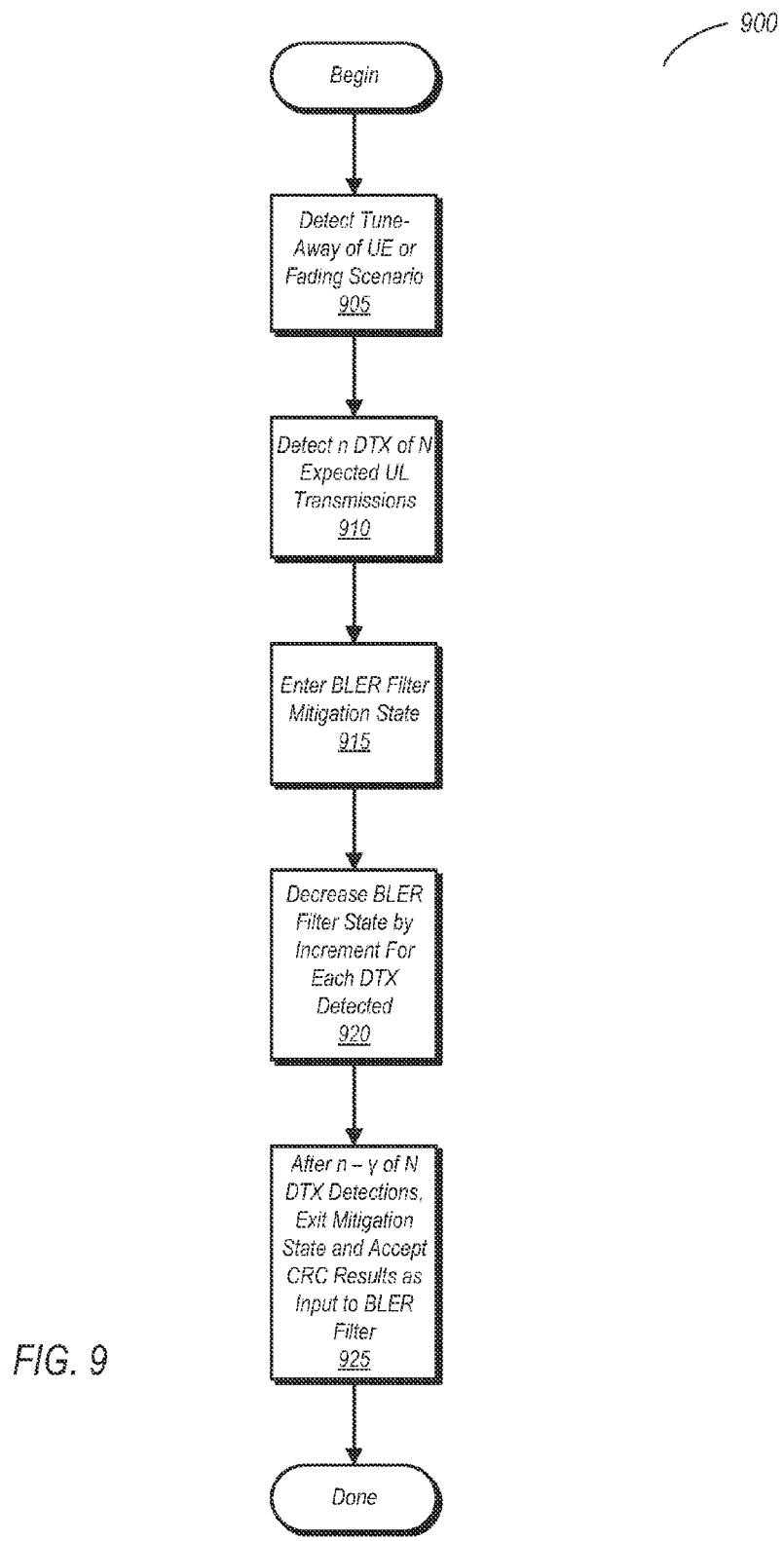
FIG. 9 is a flow diagram of another embodiment of a method for adapting an outer loop responsive to a BS detecting a tune away of the UE to a second network or detecting deep fading condition.

FIG. 9 is a flow diagram of another embodiment of a method for adapting an outer loop responsive to a BS detecting a tune away of the UE to a second network or detecting deep fading condition. Method 900 begins with the detection of a tune-away or fading scenario (block 905) as described above. After detecting n DTX of N expected UL transmissions by the UE (block 910), the BS may cause a filter to stop feeding CRC errors to the BLER filter to place it into a mitigation state (block 915). Once in the mitigation state, the BLER filter state may be decreased in incremental values for each DTX detection (block 920). As the BLER filter state decreases, it may move toward a more acceptable value that will allow for faster convergence on a re-tune by the UE. After n-γ out N DTX detections, the BS may cause an exit of the mitigation state and begin accepting CRC results as inputs to the BLER filter (block 925).

Figure 10:
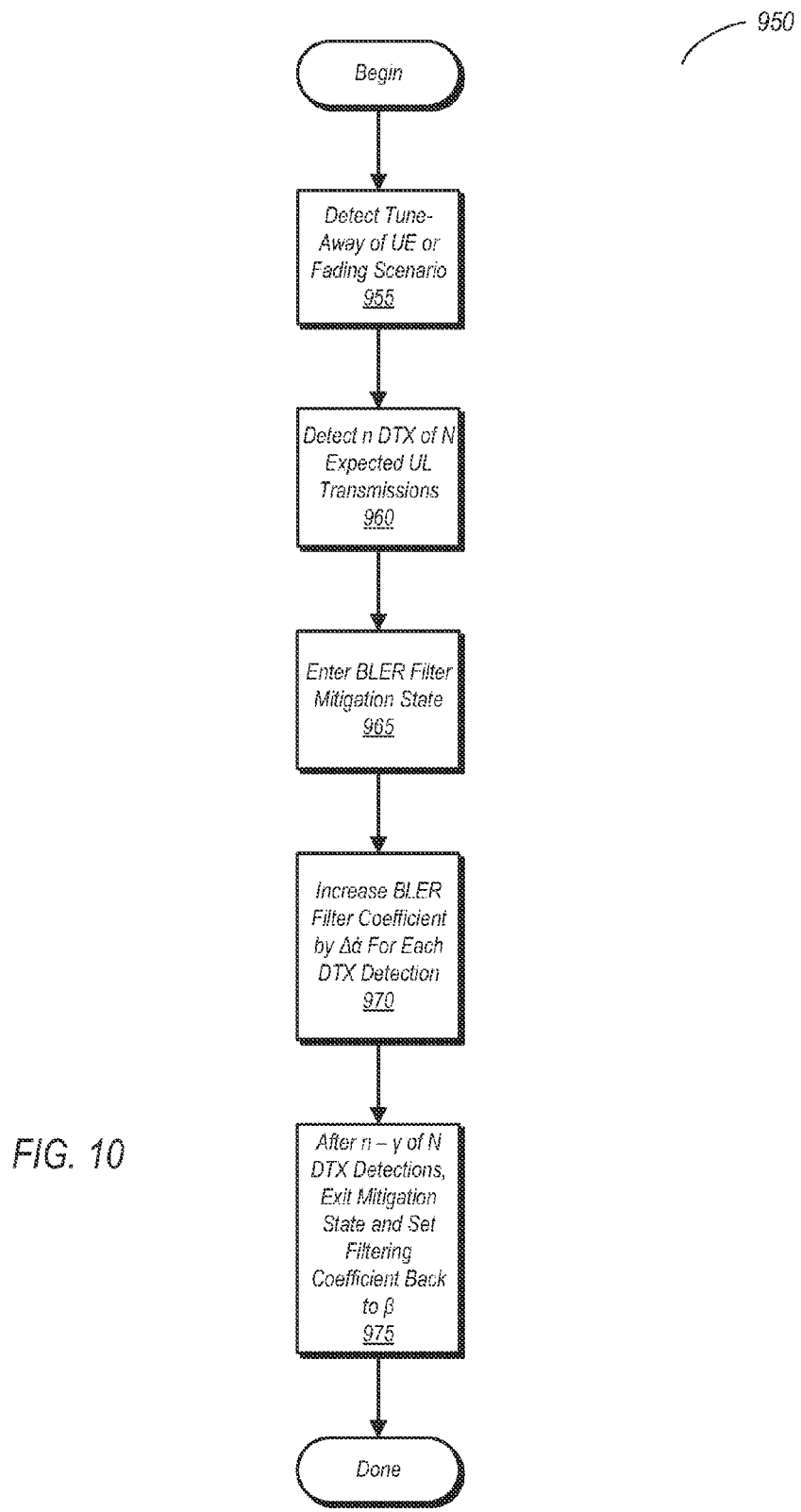
FIG. 10 is a flow diagram illustrating a third embodiment of a method for adapting an outer loop responsive to a BS detecting a tune away of the UE to a second network or detecting deep fading condition.

FIG. 10 is a flow diagram illustrating a third embodiment of a method for adapting an outer loop responsive to a BS detecting a tune away of the UE to a second network or detecting deep fading condition. Method 950 begins with the detection of a tune-away by a UE or a fading scenario as described above (block 955). After a detection of n DTX of N expected UL transmissions (block 960), the base station may cause the BLER filter to enter a mitigation state (block 965). Thereafter, a BLER filter coefficient may be increased by a value of Δα for each DTX detection (block 970). After After n-γ out N DTX detections, the BS may cause an exit of the mitigation state and set the filtering coefficient back to a value β, where α>β.

In one embodiment, the BLER filter may be implemented as an IIR filter for use in the methods discussed above. In another embodiment, the BLER filter may be implemented as a FIR filter in the methods discussed above. Embodiments of the methods discussed above that use window-based averaging.

Additional factors may also be considered in performance of the methods discussed above by a BS. Doppler is one factor that may be considered in during the performance of the methods discussed above. In one embodiment, a BS may choose the methodology to be performed based on Doppler indications. For example, a BS may choose method 800 of FIG. 8 in a situation where Doppler indicates that the subject UE is relatively stationary or moving very slowly. Method 800 may also be chosen if Doppler indicates that the UE is moving toward the BS. In another example, if Doppler indicates that the UE is moving away from the BS, the BS may perform an embodiment of method 900 shown in FIG. 9 or 950 shown in FIG. 10. A BS may also consider the velocity at which the UE is moving as indicated by Doppler in choosing a methodology to perform. Furthermore, the velocity at which a UE is moving may be used by the BS to determine the size of the BLER filter state increments (e.g., in block 920 of Method 900), or the Δα increments (e.g., in block 970 of Method 950). A BS may also use information regarding the motion of the UE extracted from Doppler to ascertain the likelihood that the UE will attempt to re-tune to that BS. For example, a BS may consider a stationary UE more likely to attempt to re-tune to that BS than one that is rapidly moving away therefrom.

Numerous variations and modifications will become apparent to those skilled in the art once the above disclosure is fully appreciated. It is intended that the following claims be interpreted to embrace all such variations and modifications.

What is claimed is:

1. A method comprising:
   detecting, at a base station of a first network that a wireless device has tuned away from the first network to a second network, wherein the wireless device includes a single radio for communications with the first network and the second network; and
   adjusting one or more control loop parameters responsive to determining that the wireless device has tuned away from the first network, wherein adjusting the one or more control loop parameters includes inhibiting cyclic redundancy check (CRC) errors from being provided to a block error rate filter and further includes incrementally increasing a block error rate filter (BLER) coefficient value;

wherein the method further comprises the base station detecting discrete transmissions from the wireless device and further configured to determine a direction of motion of the wireless device relative to the base station based on Doppler estimation, and the BLER filter in the base station adjusting one or more of its parameters based on the Doppler estimation.

2. The method as recited in claim 1, wherein said adjusting comprises changing a parameter of the block error rate filter.

3. The method as recited in claim 2, wherein said adjusting comprises resetting a block error rate filter state value and further comprises inhibiting the block error rate filter state from rising above a value to which it was reset.

4. The method as recited in claim 2, wherein said adjusting comprises incrementally decreasing a block error rate filter state value.

5. An apparatus comprising:
a base station of a first wireless network, wherein the base station is configured to determine that a wireless device in communication with the first wireless network has tuned its radio to a second wireless network;
wherein responsive to detecting that the wireless communications device has tuned its radio to the second wireless network, the base station is configured to adjust one or more control loop parameters, wherein adjusting the one or more control loop parameters includes inhibiting cyclic redundancy check (CRC) errors from being provided to a block error rate filter (BLER) of the base station;
wherein the base station includes a receiver configured to detect discrete transmissions from the mobile communication device and further configured to determine a direction of motion of the mobile communication device relative to the base station based on Doppler estimation, and wherein the BLER filter is configured to adjust one or more of its parameters based on the Doppler estimation including incrementally adjusting a incrementally increasing a BLER filter coefficient value.

6. The apparatus as recited in claim 5, wherein the base station is configured perform said adjusting by resetting a block error rate filter (BLER) state value.

7. The apparatus as recited in claim 5, wherein the base station is configured to perform said adjusting by incrementally adjusting a block error rate filter state value.

8. An apparatus comprising:
a base station for a mobile communications network, wherein the base station is configured to communicate with a mobile communication device and further configured to detect if the mobile communication device has tuned away to another network based on detection of one or more uplink signals transmitted by the mobile communication device;
wherein the base station include a block error rate (BLER) filter, wherein responsive to the base station detecting that the mobile communication device has tuned away to another network, the BLER filter is configured to adjust one or more of its parameters, including a block error rate coefficient value;
wherein the base station is further configured to inhibit the BLER filter from receiving cyclic redundancy check (CRC) errors responsive to detecting that the mobile communication device has tuned away to another network; and
wherein the base station includes a receiver configured to detect discrete transmissions from the mobile communication device and further configured to determine a direction of motion of the mobile communication device relative to the base station based on Doppler estimation, and wherein the BLER filter is configured to adjust one or more of its parameters based on the Doppler estimation.

9. The base station as recited in claim 8, wherein the BLER filter is configured to reset a BLER filter state responsive to the base station detecting that the mobile communication device as tuned away to another network.

10. The base station as recited in claim 8, wherein the BLER filter is configured to incrementally adjust a block error rate filter state value responsive to the base station detecting that the mobile communication device as tuned away to another network.

11. The base station as recited in claim 8, wherein the BLER filter is configured to incrementally increase the block error rate filter coefficient value for a filter in the base station responsive to the base station detecting that the mobile communication device as tuned away to another network.

* * * * *